United States Patent [19]
Yokota et al.

[11] 3,755,161
[45] Aug. 28, 1973

[54] TREATMENT PROCESS FOR REMOVAL OF METALS AND TREATING AGENT THEREFOR

[75] Inventors: Noriyuki Yokota, Ashiya; Shingo Tokuda, Nishinomiya; Yoshiro Ito, Amagasaki; Hiroshi Takatomi, Osaka, all of Japan

[73] Assignee: Osaka Soda Co., Ltd., Osaka, Japan

[22] Filed: Jan. 5, 1971

[21] Appl. No.: 104,160

[30] Foreign Application Priority Data

Feb. 5, 1970  Japan............................45/10146
Feb. 26, 1970  Japan............................45/17353
Feb. 26, 1970  Japan............................45/17354
April 13, 1970  Japan............................45/31412

[52] U.S. Cl............................ 210/36, 55/72, 55/73, 55/74, 210/38
[51] Int. Cl............................................. B01d 15/00
[58] Field of Search............................ 55/72, 74, 75; 210/24, 36, 38; 260/429, 429.5

[56]  References Cited
UNITED STATES PATENTS

| | | | |
|---|---|---|---|
| 3,196,107 | 7/1965 | Tomic.................... | 210/38 |
| 3,310,530 | 3/1967 | White..................... | 210/38 X |
| 3,284,351 | 11/1966 | Dajani et al........... | 210/38 X |
| 2,645,621 | 7/1953 | D'Alio.................... | 210/36 X |
| 3,111,503 | 11/1963 | O'Connor et al...... | 260/429 J |
| 3,408,291 | 10/1968 | Thomas et al......... | 210/38 X |
| 2,954,276 | 9/1960 | Hazen..................... | 210/38 X |
| 3,420,709 | 1/1969 | Barrett, Jr. et al.... | 210/36 X |

Primary Examiner—Samih N. Zaharna
Attorney—Sherman & Shalloway

[57]  ABSTRACT

A treament process for removing metals from a gaseous phase or liquid phase metal-containing material using a solid treating agent consisting of a carrier material and a compound deposited thereon, such compound being selected from (a) an organic compound capable of forming a mercaptide compound of a metal, which compound has the —SH radical or an alkali salt thereof in its molecule and may also have a member or members selected from the group consisting of the —N=, —S—, -NH-, —N=N– and —NH–NH– radicals in the same molecule; (b) an organic compound capable of forming a mercaptide compound of a metal, which compound has the

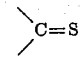

radical in its molecule and also have a member or members selected from the group consisting of the —N=, —S—, —NH—, —N=N—, and —NH—NH— radicals in the same molecule; and (c) an organic compound capable of forming a chelate compound of a metal, which compound has the —OH radical in its molecule and also a member or members selected from the group consisting of the —N= and —NH$_2$ radicals in the same molecule.

7 Claims, No Drawings

TREATMENT PROCESS FOR REMOVAL OF METALS AND TREATING AGENT THEREFOR

This invention relates to an improved treatment process by which residual metals contained in gaseous phase (a terminology inclusive of vapor phase) or liquid phase (a terminology inclusive of the liquid phase in a slurry state) materials to be treated can be removed with an excellent removal capacity, down to a low concentration such as can be indicated in ppb units (1 ppb = 1/1000 ppm), using a readily manufactured and readily available treating agent, while maintaining the foregoing capacity of the treating agent for a prolonged period of time and, moreover, at an especial advantage from the standpoint of the equipment and operations involved.

More specifically, the invention relates to a treatment process for removing metals and a treating agent to be used therein, such process being characterized in that the gaseous or liquid phase metal-containing material to be treated is contacted with in solid treating agent which consists of a carrier material supporting by adsorption thereto a compound selected from the group consisting of a. an organic compound capable of forming a mercaptide compound of a metal, which compound has the —SH radical or an alkali salt thereof in the molecule and may also have a member or members selected from the group consisting of —N=, —S—, —NH—, —N=N— and —NH—NH— radicals in the same molecule;

b. an organic compound capable of forming a mercaptide compound of a metal, which compound has the

radical in the molecule and also has a member or members selected from the group consisting of the —N=, —S—, —NH—, —N=N— and —NH—NH— radicals in the same molecule; and c. an organic compound which can form a chelate compound of a metal, which compound has the —OH radical in the molecule and also has a member or members selected from the group consisting of the —N= and —NH$_2$ radicals in the same molecule.

Heretofore, the following metal-containing waste gases, waste liquids and the like are known: concentrated aqueous caustic alkali solution obtained from the electrolysis of alkali salts by the mercury cell; hydrogen gas and synthetic hydrochloric acid synthesized from said hydrogen gas and chlorine gas; various other waste water and waste gases formed during the electrolysis of alkali salts by the mercury cell; various waste liquids and waste gases which are produced during the smelting of zinc, mercury, copper and other metals; waste water of the plating industry; waste liquors containing catalysts or decomposed products thereof, which have been used in the polymerization reaction and other catalytic reactions; various waste liquors of the synthetic chemical industry which use metal compounds; and other metal-containing and especially heavy metal-containing waste gases, waste liquids and the like, which are produced in a broad range of inorganic and organic industries and the mining industry.

Lately, the desire is especially great that these metals be removed from these generally harmful metal-containing waste gases and waste liquids to such a low content as to be substantially tolerable for preventing the environmental pollution, inclusive of the instances in which the conjoint purpose is to recover the metals contained.

The usual method which is employed for removing the metals from the metal-containing materials to be treated is either that in which the metal is precipitated or flocculated by adding a precipitating agent or a flocculating agent and thereafter isolating and collecting the metal, or that in which the metal is absorbed and isolated by using an adsorbent such as active carbon.

However, in the case of the former method it was exceedingly difficult to separate the supernatant liquid and the metal-containing precipitate or flocculate from the large quantity of the waste liquid being treated. Further, there was the necessity for the use of a great quantity of the treating agent and the need for a large scale precipitating apparatus or precision filtration apparatus for fully separating and removing the fine metal-containing solids portion. On the other hand, in the case of the latter method, it was very difficult to reduce the concentration of the residual metal in the liquid to as low a content as desired.

Further as the method of removing the metals from the gaseous phase metal-containing materials to be treated, and particularly the removal of the vapor phase metals, inter alia mercury contained in the gas, the method known heretofore was either that of cooling the gas to a low temperature at normal pressure or superatmospheric pressure of 3–5 kg/cm$^2$ and condensing the mercury vapor and separating same, or that in which the mercury was absorbed by passing the gas through a layer packed with active carbon or a molecular sieve.

However, the former of these methods requires a large-scale cooling equipment for cooling the gas, while the latter method has the drawback that in the case of active carbon and molecular sieve the amount of mercury absorbed in the gas is small, with the consequence that they are relatively poor in efficiency as adsorbents for they are required to be used in large quantities.

Again, as a chemical method of removing metals from metal-containing materials in the gaseous phase, there is a method of removing mercury from hydrogen gas as a mercuric chloride by treating with a hypochlorite. Further, a method of treatment by means of a sulfuric acid-added potassium permanganate solution is also practiced, but there is the drawback that the adjustment during the operation is difficult and that recontamination of the gas by means of the excess chlorine takes place.

In addition, as a method of treatment with ozone, there is a method in which the gas containing the mercury is treated with ozone and separation is carried out with an electrostatic separator or mechanical filtration, but difficulty is involved in the separation or filtration operation.

While several instances of possible methods have been described hereinbefore, the removal of metals from the gaseous or liquid phase metal-containing materials being treated, inclusive of the instances where the conjoint purpose is to recover the metals, not only involves considerable difficulties but also possesses drawbacks which need solution. There is particularly the limitation that a costly method from the standpoint of the treating agent, apparatus and operations cannot be utilized for the solution of the foregoing difficulties and drawbacks, since in the case of these waste liquids and waste gases the amount to be treated is usually very great, and hence the solution of the problem is made very great, and hence the solution of the problem is made much more difficult. This is the present state of affairs.

As a result of our researches with a view to overcoming the foregoing difficulties and drawbacks and providing a method which can be carried out advantageously without being subjected to the aforesaid limitation, we found that by using a solid treating agent to which has been adsorbed and deposited a certain organic compound which is capable of forming a mercaptide compound or an N,O- co-ordinate chelate compound of a heavy metal, metals could be removed with a remarkably excellent metal capturing capacity from the metal-containing material being treated regardless of whether it is in a gaseous or liquid phase and moreover with this removal capacity being maintained stably over a prolonged period of time. On the basis of this finding, we were able to succeed in developing a treatment method which demonstrates greatly improved results.

Further, it was found that the coordinative conditions involving (1) the use as the adsorptive carrier material a carbonaceous material or other adsorptive carrier materials, which have been used heretofore independently for these treatments, and (2) the deposition thereon by adsorption thereto of the hereinbefore described organic compound were indispensable for achieving the objectives of the invention, and that a metal captivating and removal capacity of high degree wholly unexpected by the use of the organic compound and carrier separately was demonstrated.

It is therefore an object of the present invention to provide an improved treatment process by which metals contained in a gaseous or liquid phase metal-containing material being treated can be captured and removed with remarkably excellent removal capacity, using a readily manufactured and readily available inexpensive treating agent. Another object is to provide a method of removing the aforesaid metals advantageously with an exceedingly simple apparatus and operation with no limitation from the cost standpoint while maintaining the metal removal capacity of the aforesaid treating agent over a prolonged period of time. A further object is to provide an inexpensive treating agent of high performance, which is suitable for use in the hereinbefore described treatment.

Other objects and advantages of the present invention will become apparent from the following description.

In the process of the invention a solid treating agent consisting of an organic compound capable of forming a mercaptide compound or an N,O- co-ordinate chelate compound of a metal, which is supported by a carrier material by adsorption thereto is used.

The foregoing organic compound is selected from the following groups (a), (b) and (c);

a. an organic compound capable of forming a mercaptide compound of a metal, which compound has the —SH radical or an alkali salt thereof in the molecule and may also have a member selected from the group consisting of the —N=, —S—, —NH—, —N=N— and —NH—NH— radicals in the same molecule;

b. an organic compound capable of forming a mercaptide compound of a metal, which compound has the

radical in the molecule and also has a member selected from the group consisting of the —N=, —S—, —NH—, —N=H— and —NH—NH— radicals in the same molecule; and c. an organic compound capable of forming an N,O coordinate chelate compound of a metal, which compound has the —OH radical in the molecule and also has a member selected from the group consisting of the N= and —NH$_2$ radicals in the same molecule.

As examples of the these compounds, those of group (a), above include the following groups (1) – (4) :

1. Mercaptide compounds of the formula

R-S-M wherein R is an aromatic group or a group having a terminal —CH= or —CH$_2$— radical, and M is hydrogen or an alkali metal.

2. Thiazole compounds of the formula

wherein R is an aromatic group and M is hydrogen or an alkali metal.

3. Di-alkyldithiocarbamic acid of the formula

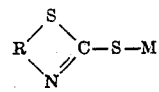

wherein R is a C$_1$ – C$_{10}$ alkyl radical, methyl, ethyl, n-butyl, etc., and M is hydrogen or an alkali metal. (4) Xanthates of the formula

R—O—C—S—M wherein R is butyl or isopropyl and M is hydrogen or an alkali metal.

Specific examples of the compounds or group (a) include the following organic compounds which can form a mercaptide compound of a metal.

2-Aminoethanethiol (H$_2$NCH$_2$CH$_2$SH)

butyl-mercaptan (C$_4$H$_9$SH)

Cyclohexylamine salt of 2-mercaptobenzothiazole

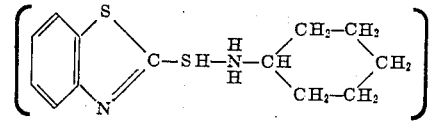

ᵻ L-cysteine

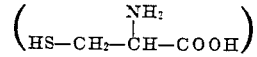

ᵻ Di-alkyldithiocarbamic acid (alkali metal salt)

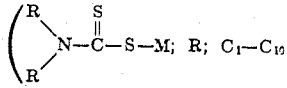

alkyl radical like as methyl, ethyl and n-butyl, M; alkali metal)

ᵻ 2.3-dimercapto-1-propanol

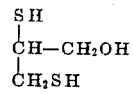

* Glutathione

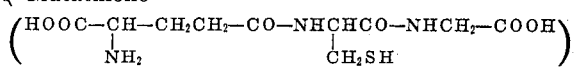

* 2-mercaptobenzothiazole

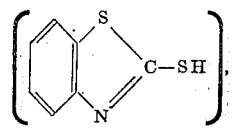

* and its alkali metal salts.
* 2-mercaptoethanol (HO—CH₂—CH₂SH)

* dl-mercaptosuccinic acid

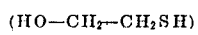

* Pipecolin pipecolyl dithio carbamate

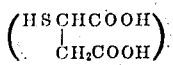

* Piperidine pentamethylene dithio carbamate

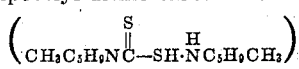

* Thioacetic acid (CH₃COSH)
* Thioglycolic acid (HS·CH₂COOH) o and its alkali metal salts.
* Thionalide

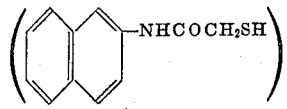

* Thiophenol

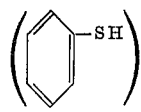

* and its alkali metal salts.
* Isopropyl xanthic acid

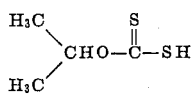

* and its alkali metal salts.

Examples of the compounds of group (b), above, include the following:
1. Thiocarbazones of the formula

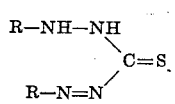

wherein R is an aromatic group.
2. Thioureas of the formula

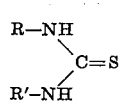

wherein R and R' are each an aromatic group or a C₁ – C₁₀ alkyl radical.
3. 2-Mercaptobenzimidazole.
4. 2-Mercaptoimidazoline.

Specific examples of the compounds of group (b) include the following organic compounds which can form a mercaptide compound of a metal.

* Bismuthiol II

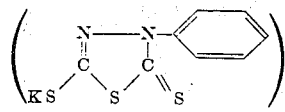

* p-dimethylaminobenzylidenerhodamine

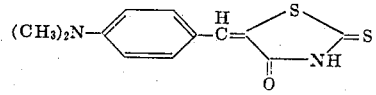

* Di-β-naphthylthiocarbazone

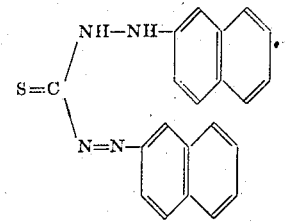

* Dithizone

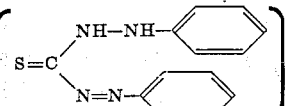

* 2-mercaptobenzimidazole (O-phenylene thiourea)

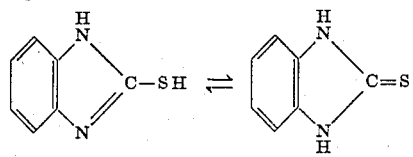

* 2-mercaptoimidazoline (ethylenethiourea)

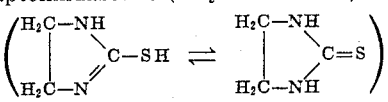

* Thiocarbanilide

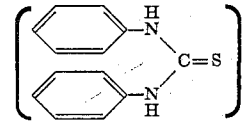

* Di-orthotolylthiourea

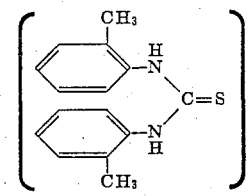

* Trimethylthiourea

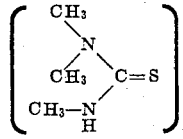

On the other hand, specific examples of the compounds of group (c) include the following organic compounds which can form an N,O— co-ordinate chelate compound of a metal;

Anthranylic acid

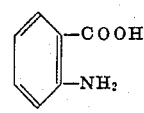

Oxine

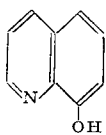

2-methyl oxine, i.e., 8 hydroxyquinaldine

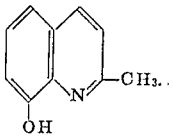

While the hereinabove illustrated organic compounds, which are useable in the present invention, include both those which are water-soluble as well as water-insoluble, these compounds can be dissolved in such solvents which are suitable for the several compounds and be deposited on a carrier material by adsorption thereto.

As these solvents, mention can be made of such, for example, as water, aqueous alkaline solutions containing an inorganic alkaline substance such as alkali metal hydroxides, alkali metal carbonates, alkali metal bicarbonates and ammonia; methanol, ethanol, propanol, butanol and other $C_1 - C_{10}$ aliphatic alcohols; the halogenated lower hydrocarbons such as dichloromethane, trichloromethane and trichloroethylene; dilower alkyl carbonyls such as dimethyl carbonyl; carbon tetrachloride; chloroform; and acetone.

These solvents are imposed no restrictions and can be used so long as they do not react with the foregoing organic compounds (i.e. are inert thereto) and can dissolve same. Of these solvents, preferred are those which can be readily removed after the aforesaid organic compounds have been deposited on the carrier material by adsorption thereto by such means as water-washing, washing in a dilute aqueous acid solution, evaporation, vacuum drying and air drying.

Needless to say, the use of a solvent can be dispensed with in the case where the organic compound used is one which is normally liquid.

In effecting the deposition on the carrier material by adsorption thereto of the hereinbefore described organic compound or a solvent solution thereof, any method by which the organic compound or solution thereof is brought fully into contact with the carrier material can be employed. For example, the carrier material can be submitted to an immersion treatment in these solutions, or the solutions can be flowed down through a column packed with the carrier material, or various other methods of contacting the liquid phase with the solid phase can be utilized. This operation of effecting the deposition of the organic compound on the carrier material by adsorption of the former to the latter is usually carried out at room temperature but, if desired, the operation can be carried out under heated conditions of 30° – 70°C.

After the deposition treatment, the resulting solid treating agent can be directly used but, if desired, it may be used after having been submitted to water-washing, washing in a dilute aqueous acid solution, evaporation, vacuum drying, air drying and other treatments to remove the solvent contained therein.

As the carrier material constituting the substrate of the solid treating agent to be used in the present invention, those obtained from natural or artificial sources can be widely used, but those selected from the group consisting of the carbon carriers such as active carbon and bone black, silica gel, zeolite and silica-alumina gel containing at least 50 percent by weight of silica gel demonstrate exceedingly superb improved results and thus are recommended. If desired, the organic high molecular weight adsorbents and molecular sieves can be used as the carrier material, but these are not desirable because of their high cost. Further, such carriers as alumina, magnesia and the naturally obtained quartz sand can also be used, but results obtained are inferior to those obtained in the case of the use of the hereinabove recommended carrier materials.

The size of the carrier particles can be varied over a broad range and those on the order o0 180 mesh, and preferably 6 – of 2 – mesh, may usually be used. Again, the amount in which the aforesaid organic compound is deposited on the carrier material by adsorption thereto can also be varied over a broad range, and an amount on the order of 1 – 30 percent by weight, and preferably 2 – 20 percent by weight, based on the carrier material, may usually be used. The particles size of the carrier material and the amount of the organic compound to be deposited thereon by adsorption thereto, as indicated above, can be suitably modified in accordance with the class of the carrier material, the class of the organic compound, the class of the material to be treated, the method used in effecting the contact of the material to be treated and the solid treating agent and the treatment speed.

No special restriction is imposed as to the method to be used in effecting the contact between the solid treating agent, such as hereinabove described, and the gaseous or liquid phase metal-containing material to be treated in accordance with the invention process. All of the liquid-solid phase or gaseous-solid phase contacting methods which are capable of fully contacting the treating agent with the material being treated can be utilized. While the batch method of contact can be employed, preferred is a continuous contact method such, for example, as the column method.

For example, the material being treated can be caused to flow downwardly through a column packed with the solid treating agent or conversely be caused to flow upwardly through the column; or while forming a fluidized bed of the solid treating agent the gaseous phase material being treated can be passed through such bed; or if the material being treated is of liquid phase, it can be sprayed. While the contact treatment can be carried out in a single stage, it also can be carried out in a multistage fashion by providing a plurality of contact zones through which the material being treated is passed. While there is no particular restriction imposed as to the temperature at which the treating agent and the material being treated are contacted, a range of 5° – 35°C. is frequently employed.

The contact time or speed of the solid treating agent with the gaseous or liquid phase material being treated can be readily varied by those skilled in the art in accordance with the class of the organic compound, the class and particle size of the carrier material and amount of the organic compound supported, the class of the material being treated and the method of contacting the solid treating agent with the material being treated. In general, the optimum conditions can be readily determined experimentally over a range of SV (space velocity) = 0.2 – 20 1/hr in the case the material being treated is of liquid phase and over a broad range on the order of SV = 100 – 5000 1/hr in the case the material being treated is of gaseous phase, in accordance with the hereinbefore indicated various factors.

As the metals to be contained in the gaseous or liquid phase metal-containing material to be treated by the invention process, those metals selected from the group consisting of Hg, Au, Bi, Cd, Co, Cr, Cu, Ni, Pb, Zn, Ag, Mn, Fe, Mo, Ti, Mg and Al can be mentioned. The invention process can be employed with special advantage in the treatment of a gaseous or liquid phase material containing at least one of the foregoing metals.

The hereinbefore described organic compound is preferably chosen in accordance with the class of the metal contained in the material to be treated. For example, thionalide, 2-mercaptobenzothiazole and p-dimethylaminobenzilidene-rhodanine are preferably used in the case of Hg, Cu, Au, Ag, Cd and Pb; oxine and 2-mercaptobenzothiazole, in the case of Bi, Co, Ni and Zn; and oxine and 8-hydroxyquinaldine, in the case of Mn, Cr, Fe, Mo, Ti and Mg. When the material to be treated is one containing a plurality of metals, a plurality of organic compounds can be used.

In the case where the material to be treated is one of liquid phase, it is possible according to the invention process to pretreat the material with an anion exchange resin and thereafter contact the so pretreated metal-containing material with the aforesaid solid treating agent. In general, when the content of metal is very great and the recovery of the metal is also intended, a pretreatment of this kind is desirable. Since the recovery of the metal from the anion exchange resin is a relatively simple matter, the metal contained in the metal-containing material being treated can be recovered with this pretreatment, after which the reduced amount of metal contained in the residual liquid can be contacted with the solid treating agent to effect its removal by fixation to the treating agent.

As such an anion exchange resin, mention can be made of those having as the exchange group such, for example, as $-N-(CH_3)_3X$,

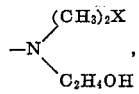

$-N(R)_2$, $-NH(R)$, $-NH_2$ and $-N(CH_3)_2$, wherein X is an anion such as $Cl^-$, $OH^-$, etc., and R is an alkyl radical such as $CH_3$, $C_2H_5$, etc.

The pretreatment operation is carried out in the following manner. The material being treated is passed successively through a column packed with the hereinbefore described anion exchange resin. Alternatively, the anion exchange resin is introduced into the treatment tank and the adsorption is carried out with stirring, after which the resin is separated from the treated liquid.

The invention process can be applied as a treatment method for removing metals from the gaseous or liquid phase metal-containing materials extending over a wide range from those which are acid to those which are alkaline. For example, the invention process can be applied to the removal of Hg from the concentrated aqueous caustic alkali solutions obtained in the mercury cell method of electrolysis of alkali salts; the removal of Hg of the hydrogen gas evolved during the aforesaid electrolysis; the removal of Hg contained in the synthetic hydrochloric acid synthesized from hydrogen gas and chlorine gas; in addition, the removal of Hg from the various waste gases and water that are produced during the mercury method of electrolysis of alkali salts; the removal of Hg, Cd, Mn, Cr, Cu, Fe, etc., from the various waste gases and water which are produced during the smelting of various metals; the removal of Cr and Cu from the waste water of the plating industry; the removal of Hg, Cd, Mn, Cr, Cu, Fe, etc., from the waste liquids containing catalysts or decomposition products thereof, as well as from the waste gases and water produced in the synthetic chemical industry; and the removal of metals contained in a wide range of other gaseous and liquid phase materials.

The following examples and control experiments are given to illustrate several modes of practicing the present invention.

EXAMPLES 1 – 2 AND CONTROL 1

Three hundred ml of carbon tetrachloride in which were dissolved 150 mg of dithizone were flowed down through a glass tube of 8 mm inside diameter packed with 5 grams of active carbon thereby causing the adsorption to and deposition on the active carbon layer of dithizone. The amount of dithizone absorbed and deposited was about 150 mg. This dithizone-supporting carrier was left standing for 24 hours to cause the carbon tetrachloride to volatilize. This was followed by flowing a saline prepared from mercuric chloride and sodium chloride (mercury content 1.4 mg per liter) down through the tube at the rate of 130 cc per hour. This test was repeated ten times. In every case the mercury concentration of the effluent became less than 5 ppb.

Further, about 5 grams of the dithizone-supporting carrier prepared as in Example 1 were added to 200 ml of saline containing 1.4 mg/l of mercury, the contact being carried out for one hour with gentle stirring (Example 2), with the result that the mercury concentration of the aqueous solution became less than 5 ppb.

A control, the experiment was carried out exactly as in Example 1 except that the adsorption to and deposition on the active carbon of the dithizone was not carried out and 5 grams of active carbon were used (Control 1). The test was repeated 10 times and in every instance the mercury concentration of the effluent was above 420 ppb.

The results obtained in the foregoing experiments are shown in Table 1.

TABLE 1

| Experiment No. | Treating agent | | | | Metal to be removed | Metal concentration (p.p.b.) | |
| --- | --- | --- | --- | --- | --- | --- | --- |
| | Organic compound | | Carrier | | | | |
| | Name | Amount adsorbed (wt. percent) | Name | Weight (g.) | | Before treatment | After treatment |
| Example 1 | Dithizone | 3 | Active carbon | 5 | Hg | 1,400 | <5 |
| Example 2 (batch method) | do | 3 | do | 5 | Hg | 1,400 | <5 |
| Control 1 | | | do | 5 | Hg | 1,400 | >420 |

As is apparent from the results given in the Table 1, above, it can be seen that totally unexpected results were achieved in accordance with the invention process as compared with the case where the adsorbent carrier was used alone.

EXAMPLE 3 AND CONTROL 2

The experiments were carried out as in Example 1 and Control 1 except that 2-mercaptobenzothiazole and silica gel were used as the organic compound and carrier, respectively, and the carrier weight, amount of the organic compound deposited thereon by adsorption and the Hg concentration of the material treated were varied. The results obtained are shown in Table 2.

carbon thereby effecting the thorough adsorption to and deposition on the active carbon layer of the thionalide, followed by removal of the solvent by blowing in air. A solution containing 5.6 mg per liter of mercury was flowed down through this thionalide-supporting carrier at the rate of 130 ml per hour, whereupon the mercury concentration of the effluent became less than 50 ppb.

TABLE 2

| Experiment No. | Organic compound | | Carrier | | Metal to be removed | Metal concentration (p.p.b.) | |
|---|---|---|---|---|---|---|---|
| | Name | Amount deposited (wt. percent) | Name | Weight (g.) | | Before treatment | After treatment |
| Example 3 | 2-mercaptobenzothiazole | 5 | Silica gel | 10 | Hg | 13,900 | <5 |
| Control 2 | | | do | 10 | Hg | 13,900 | >13,000 |

The results presented in Table 2 show, as in Table 1, the totally unexpected results that can be obtained by the invention process.

EXAMPLE 4

One hundred mg of thionalide in solution in 100 ml of dichloroethane were flow down through a glass tube of 8 mm inside diameter packed with 5 grams of active

EXAMPLES 5 – 28

The experiments were carried as in Example 4, using as the method of contact either the column method or the batch method described in Example 2 and various combinations of the organic compound and carrier, with the metals to be removed of various classes. The results obtained are shown in Table 3.

TABLE 3

| | Solid treating agent | | | | | |
|---|---|---|---|---|---|---|
| | Organic compound used | | | | Carrier | |
| Experiment No. | Name | Amount deposited (wt. percent) | Solvent used | | Name | Weight (g) |
| Example 5 | 2-mercaptobenzothiazole | 10 | $CH_2Cl_2$ | | Active carbon | 5 |
| Example 6 | Thionalide | 2 | $CHCl_3$ | | do | 5 |
| Example 7 | 2-mercaptobenzothiazole | 10 | $CH_2Cl_2$ | | do | 5 |
| Example 8 | Oxine plus 2-methyloxine | 2 | $(CH_3)_2CO$ | | do | 5 |
| Example 9 | p-Dimethylaminobenzylidene rhodanine | 2 | $(CH_3)_2CO$ | | do | 5 |
| Example 10 | Thionalide | 2 | $CHCl_3$ | | do | 5 |
| Example 11 | 2-methyloxine plus 2-mercaptobenzothiazole | 12 | $CH_2Cl_2$ | | do | 5 |
| Example 12 | Dithizone | 2 | 0.5% aq. ammonia sol | | do | 5 |
| Example 13 | 2-mercaptobenzothiazole | 20 | 3% aq. NaOH sol | | do | 5,000 |
| Example 14 | 2-mercaptobenzothiazole | 10 | Acetone | | do | 5,000 |
| Example 15 | 2-mercaptobenzothiazole (Na salt) | 8 | Water | | do | 30 |
| Example 16 | Bismuthol II | 7.5 | do | | Bone black | 40 |
| Example 17 | Na salt of diethyldithiocarbamic acid | 5 | do | | Active carbon | 40 |
| Example 18 | Na salt of isopropyl xanthic acid | 4.5 | do | | do | 30 |
| Example 19 | Pipecoline pipecolyc dithiocarbamate | 3.5 | 3% aq. NaOH sol | | do | 40 |
| Example 20 | 2,3-dimercapto-1-propanol | 3.0 | Water | | do | 40 |
| Example 21 | 2-mercaptoethanol | 2.8 | do | | do | 30 |
| Example 22 | Na salt of 2-mercaptobenzothiazole | 2.3 | do | | Silica gel | 100 |
| Example 23 | Thionalide | 3.0 | $CHCl_3$ | | Active carbon | 5 |
| Example 24 | Bismuthiol II | 7.5 | Water | | do | 5 |
| Example 25 | 2-mercaptobenzothiazole plus anthranilic acid | Total 10 | 3% aq. NaOH sol | | do | 5 |
| Example 26 | p-Dimethylaminobenzylidene rhodanine plus 2-mercaptobenzothiazole | Total 15 | Acetone | | do | 5 |
| Example 27 | Oxine plus pipecoline pipecolyl dithiocarbamate | do | do | | do | 5 |
| Example 28 | 8-hydroxy quinaldine plus p-dimethylamino-benzylidene rhodanine | 5 | do | | do | 5 |

| Experiment No. | Time contacted with liquid material being treated (batch method) or space velocity (column method), l./hr. | Material treated | | Metal concentration (p.p.b.) | |
|---|---|---|---|---|---|
| | | Metal to be removed | Property | Before treatment | After treatment |
| Example 5 | 6.5 | Hg | Aq. sol | 5,600 | 5 |
| Example 6 | 10 | Hg | Aq. sol | 5,600 | 50 |
| | | Cu | Same as above | 2,500 | 10 |
| Example 7 | | Hg | Aq. sol | 5,600 | 5 |
| | | Fe | Same as above | 300 | |
| Example 8 | 7.5 | Cr | Aq. sol | 500 | 70 |
| | | Mn | Same as above | 700 | 50 |
| Example 9 | 7.0 | Hg | Aq. sol | 13,900 | 5 |
| Example 10 | 7.8 | Cd | Same as above | 200 | 30 |
| Example 11 | 8.0 | Hg | do | 5,600 | 5 |
| Example 12 | 9.0 | Hg | do | 9,800 | 5 |
| Example 13 | 10.5 | Hg | do | 10,200 | 5 |
| Example 14 | Contact time 1 hour | Hg | Aq. slurry | 25,000 | 250 |
| Example 15 | Contact time 2.5 hours | Hg | Aq. sol | 8,200 | 7 |
| | | Cd | Same as above | 600 | 40 |
| Example 16 | do | Hg | Aq. sol | 5,500 | 9 |
| | | Cu | Same as above | 500 | 50 |
| Example 17 | 2.1 | Hg | Aq. sol | 5,600 | 8 |
| | | Cu | Same as above | 1,200 | 54 |

| Experiment No. | Time contacted with liquid material being treated (batch method) or space velocity (column method), l./hr. | Material treated — Metal to be removed | Material treated — Property | Metal concentration (p.p.b.) Before treatment | Metal concentration (p.p.b.) After treatment |
|---|---|---|---|---|---|
| Example 18 | 2.1 | Hg | Aq. sol | 8,200 | 6 |
| Example 19 | 1.1 | Hg | Same as above | 7,800 | 8 |
| Example 20 | 1.0 | Hg | do | 2,500 | 10 |
| Example 21 | 1.0 | Hg | do | 2,700 | 12 |
| Example 22 | 2.0 | Hg | Aq. sol | 8,200 | 8 |
| | | Cd | Same as above | 600 | 50 |
| Example 23 | 10 | Hg | Aq. sol | 9,800 | 50 |
| | | Ag | Same as above | 1,200 | 70 |
| | | Pb | do | 4,100 | 75 |
| Example 24 | 8.0 | Al | Aq. sol | 1,600 | 100 |
| | | Cd | Same as above | 750 | 40 |
| | | Cu | do | 1,200 | 55 |
| | | Hg | do | 9,800 | 20 |
| Example 25 | 7.0 | Co | Aq. sol | 900 | 50 |
| | | Zn | Same as above | 1,500 | 55 |
| | | Cd | do | 3,500 | 25 |
| | | Ni | do | 700 | 40 |
| | | Hg | do | 7,700 | 7 |
| Example 26 | 7.5 | Ag | Aq. sol | 2,400 | 35 |
| | | Bi | Same as above | 420 | 15 |
| Example 27 | 6.0 | Mn | Aq. sol | 1,200 | 60 |
| | | Cr | Same as above | 720 | 75 |
| | | Fe | do | 2,900 | 25 |
| Example 28 | 6.5 | Mo | Aq. sol | 950 | 60 |
| | | Ti | Same as above | 1,300 | 75 |
| | | Mg | do | 750 | 80 |
| | | Ag | do | 1,200 | 30 |

EXAMPLES 29 - 55 AND CONTROL 3

Experiments were carried out with the mercury-containing materials to be treated being those having an acid property and those having an alkaline property. As the former, mercury-containing concentrated aqueous hydrochloric acid solutions were used while, as the latter, mercury-containing aqueous caustic alkali solutions were used. The results obtained are shown in Table 4. Also shown in Table 4 are the results obtained as Control 3 wherein the experiment was carried out exactly as in Example 53 except that an organic compound was not deposited on the active carbon.

TABLE 4

| | Solid treating agent | | | | |
|---|---|---|---|---|---|
| | Organic compound used | | | Carrier | |
| Experiment No. | Name | Amount deposited (wt. percent) | Solvent used | Name | Weight (g.) |
| Example 29 | Na salt of 2-mercaptobenzothiazole | 10 | Water | Active carbon | 100 |
| Example 30 | 2-mercaptobenzothiazole | About 20 | 3% aq. NaOH sol | do | 40 |
| Example 31 | Pipecoline pipecolyl dithiocarbamate | About 10 | Acetone | do | 20 |
| Example 32 | Thionalide | About 2.5 | Dichloromethane | do | 20 |
| Example 33 | Dithizone | About 1.0 | CCl₄ | do | 10 |
| Example 34 | p-Dimethylaminobenzylidene rhodanine | About 4.0 | Acetone | do | 10 |
| Example 35 | Di-β-naphthyl thiocarbazone | About 1.0 | Chloroform | do | 10 |
| Example 36 | 2-mercaptobenzothiazole | About 2.0 | 3% aq. NaOH sol | Bone black | 10 |
| Example 37 | Bismuthiol II | About 3.0 | Water | Active carbon | 20 |
| Example 38 | Thiophenol | About 1.0 | Ethanol | do | 10 |
| Example 39 | Piperidine pentamethylene thiocarbamate | About 5.0 | Acetone | do | 10 |
| Example 40 | 2-mercaptoimidazoline | About 2.0 | Methanol | do | 10 |
| Example 41 | Sodium diethyldithiocarbamate | About 5.0 | Water | do | 20 |
| Example 42 | 2-mercaptobenzothiazole | About 3.0 | Acetone | Silica gel | 10 |
| Example 43 | p-Dimethylaminobenzylidene rhodanine | About 1.5 | do | Zeolite | 20 |
| Example 44 | Sodium diethyldithiocarbamate | About 5.0 | 6% aq. NaOH sol | Active carbon | 150 |
| Example 45 | 2-mercaptobenzothiazole | 10 | Acetone | do | 40 |
| Example 46 | L-cysteine | 6.0 | Water | Pwd. active carbon | 50 |
| Example 47 | Sodium salt of 2-mercaptobenzothiazole | About 5.0 | do | Active carbon | 40 |
| Example 48 | Glutathione (reduced type) | About 3.0 | do | Pwd. active carbon | 50 |
| Example 49 | L-cysteine | About 2.0 | Weak alkali | Molecular sieve | 40 |
| Example 50 | Bismuthiol II | 1.5 | Water | Active carbon | 40 |
| Example 51 | Sodium salt of thiophenol | 1.0 | Weak alkali | Pwd. active carbon | 50 |
| Example 52 | 2-mercaptobenzothiazole | About 1.5 | Acetone | Zeolite | 40 |
| Example 53 | Thioglycolic acid | About 1.0 | Water | Active carbon | 40 |
| Example 54 | Di-β-naphthylcarbazone | About 2.0 | Chloroform | do | 40 |
| Example 55 | Thionalide | About 2.5 | Dichloromethane | Pwd. active carbon | 50 |
| Control 3 | | | | Active carbon | 40 |

| Experiment No. | Time contacted with liquid material being treated (batch method) or space velocity (column method), l./hr. | Material treated — Metal to be removed | Material treated — Property | Metal concentration (p.p.b.) Before treatment | Metal concentration (p.p.b.) 120 hrs. later |
|---|---|---|---|---|---|
| Example 29 | Contact time 2 hours | Hg | Conc. HCl | 2,500 | 7 |
| Example 30 | 11.0 | Hg | Conc. HCl | 1,700 | 4 |
| Example 31 | Contact time 2 hours | Hg | Conc. HCl | 1,700 | 6 |
| Example 32 | Contact time 2.5 hours | Hg | Conc. HCl | 1,700 | 30 |
| Example 33 | do | Hg | Conc. HCl | 1,700 | 28 |
| Example 34 | Contact time 2.0 hours | Hg | Conc. HCl | 1,700 | 5 |
| Example 35 | Contact time 2.5 hours | Hg | Conc. HCl | 1,700 | 30 |
| Example 36 | Contact time 2.0 hours | Hg | Conc. HCl | 1,300 | 12 |
| Example 37 | Contact time 3.0 hours | Hg | HCl 35% | 1,300 | 24 |

| | Solid treating agent | | | | |
|---|---|---|---|---|---|
| | Organic compound used | | | Carrier | |
| Experiment No. | Name | Amount deposited (wt. percent) | Solvent used | Name | Weight (g.) |
| Example 38 | Contact time 2.0 hours | | Hg | HCl 35% | 1,300 30 |
| Example 39 | Contact time 2.5 hours | | Hg | HCl 35% | 1,300 15 |
| Example 40 | do | | Hg | HCl 35% | 1,300 25 |
| Example 41 | do | | Hg | HCl 35% | 1,700 30 |
| Example 42 | do | | Hg | HCl 35% | 1,700 10 |
| Example 43 | do | | Hg | HCl 35% | 1,300 8 |
| Example 44 | Contact time 3 hours | | Hg | NaOH 25% | 150 30 |
| Example 45 | 0.7 | | Hg | NaOH 48% | 250 15 |
| Example 46 | 1.5 | | Hg | KOH 48% | 120 10 |
| Example 47 | 2.0 | | Hg | NaOH 48% | 120 10 |
| Example 48 | 0.8 | | Hg | NaOH 48% | 200 30 |
| Example 49 | 1.2 | | Hg | NaOH 48% | 100 15 |
| Example 50 | 0.5 | | Hg | NaOH 48% | 100 15 |
| Example 51 | 0.4 | | Hg | NaOH 48% | 130 30 |
| Example 52 | 0.5 | | Hg | KOH 45% | 200 27 |
| Example 53 | 0.4 | | Hg | NaOH 48% | 150 25 |
| Example 54 | 1.2 | | Hg | KOH 45% | 100 30 |
| Example 55 | 1.5 | | Hg | NaOH 48% | 130 30 |
| Control 3 | 0.4 | | Hg | | 150 120 |

EXAMPLES 56 – 67 AND CONTROL 4

Sixty grams of 2-mercaptobenzothiazole were dissolved in 1.2 liters of a caustic soda solution of 3% concentration, after which the resulting solution was flowed down through 300 grams of active carbon of 6 – 20 mesh to effect the full adsorption of the former to the latter. The amount adsorbed was about 18 percent by weight based on the active carbon.

After water-washing and air drying the 2-mercaptobenzothiazole-adsorbed active carbon particles, they were packed in an acrylic resin tube of 60 mm inside diameter and about 25 cm high. This was followed by passing hydrogen gas containing 9.1 mg per cubic meter of mercury through the tube at a space velocity of 2500 l/hr at room temperature, whereupon the mercury content of the hydrogen gas after passage through the tube was 0.001 mg/m$^3$ 6 hours later, 0.002 mg/cm$^3$ 30 hours later and 0.002 mg/m$^3$ 90 hours later.

Experiments were carried out as in the hereinabove described Example 56, varying the organic compound and the class of the carrier. The results obtained are shown in Table 5, below, along with the results of Example 56. Also presented are the results of Control 4, which was also carried out as in Example 56 but without deposition of an organic compound on the carrier.

TABLE 5

| | Solid treating agent | | | | |
|---|---|---|---|---|---|
| | Organic compound used | | | Carrier | |
| Experiment No. | Name | Amount deposited (wt. percent) | Solvent used | Name | Weight (g.) |
| Example 56 | 2-mercaptobenzothiazole | 18 | 3% aq. NaOH sol | Active carbon | 300 |
| Control 4 | | | | do | 300 |
| Example 57 | p-Dimethylaminobenzylidene rhodanine | About 4.0 | Acetone | do | 25 |
| Example 58 | Dithizone | 2.0 | 5% aq. NaOH sol | do | 20 |
| Example 59 | Thionalide | 3.0 | Dichloroethane | do | 25 |
| Example 60 | 2-mercaptobenzothiazole | 2.0 | 5% aq. NaOH sol | Bone black | 40 |
| Example 61 | do | 1.0 | Same as above | Silica gel | 75 |
| Example 62 | do | 5.0 | do | Active carbon | 20 |
| Example 63 | Pipecoline pipecolyl dithiocarbamate | 3.0 | Acetone | Zeolite | 30 |
| Example 64 | 2-mercaptobenzothiazole plus pipecoline pipecolyl dithiocarbamate | 6.0 | do | Active carbon | 25 |
| Example 65 | 2-mercaptobenzothiazole | 10.0 | 3% aq. NaOH sol | do | 25 |
| Example 66 | Thiophenol | 1.0 | Ethanol | do | 25 |
| Example 67 | Sodium salt of 2-mercaptobenzothiazole | 5.0 | Water | do | 40 |

| | | Material treated | | Metal concentration ($\mu g./m.^3$) | | |
|---|---|---|---|---|---|---|
| | | | | | After treatment | |
| Experiment No. | Space velocity (l./hr.) | Metal to be removed | Property | Before treatment | 6 hrs. later | 90 hrs. later |
| Example 56 | 2,500 | Hg | H$_2$ | 9,100 | 1 | 2 |
| Control 4 | 2,500 | Hg | H$_2$ | 9,100 | 2,700 | 9,100 |
| Example 57 | 1,100 | Hg | H$_2$ | 14,100 | 2 | 4 |
| Example 58 | 4,300 | Hg | H$_2$ | 9,000 | 2 | 7 |
| Example 59 | 1,800 | Hg | H$_2$ | 10,600 | 1 | 3 |
| Example 60 | 1,700 | Hg | H$_2$ | 11,500 | 2 | 8 |
| Example 61 | 1,100 | Hg | H$_2$ | 8,400 | 2 | 10 |
| Example 62 | 2,000 | Hg | Air | 1,500 | 2 | 7 |
| Example 63 | 1,400 | Hg | H$_2$ | 8,200 | 3 | 9 |
| Example 64 | 2,100 | Hg | H$_2$ | 11,100 | 3 | 9 |
| Example 65 | 850 | Hg | HCl | 2,100 | 1 | 2 |
| Example 66 | 1,000 | Hg | H$_2$ | 8,600 | 4 | 12 |
| Example 67 | 2,100 | Hg | H$_2$ | 9,200 | 3 | 7 |

EXAMPLE 68

An acrylic resin tube of 80 mm inside diameter was packed with 3 grams of an anion exchange resin. The height of the layer was about 1000 mm. When waste water containing 13,700 ppb of mercury was flowed down through this tube at a space velocity of 12 l/hr, the mercury concentration 20 hours later was 150 ppb and 120 hours later was 560 ppb.

Further when this treated liquid was flowed down through an acrylic resin tube of 120 mm inside diameter, which had been packed in advance with a fixed layer (layer height of 1050 mm) of a treating agent consisting of 8.2 kg of 10 – 30 mesh bone black on which had been deposited by adsorption thereto 0.7 kg of 2-mercaptobenzothiazole, the mercury concentration 20 hours later was 2 ppb and 120 hours later was 5 ppb.

EXAMPLE 69

A polyvinyl chloride column having an inside diameter of 280 mm was packed with 52 kg of an anion exchange resin. The layer height was about 1200 mm. When waste water containing 9400 ppb of mercury was flowed down through this column at a space velocity of 10 l/hr, the mercury concentration 25 hours later was 120 ppb and 170 hours later was 860 ppb. Further, when this treated liquid was flowed down through a polyvinyl chloride column having an inside diameter of 600 mm, which had been packed in advance with a fixed layer (packing height 950 mm) of a treating agent consisting of 125 kg of 10 – 40 mesh active carbon on which had been deposited by adsorption thereto 22 kg of 2-mercaptobenzothiazole, the mercury concentration 25 hours later was 2 ppb and 170 hours later was 3 ppb.

Now, when the adsorbed mercury was desorbed and recovered and the anion exchange resin was regenerated but the fixed layer of the treating agent was left intact and the treatment of waste water containing 8200 ppb of mercury was carried out under substantially identical conditions as hereinabove, the mercury concentration in the waste water after 25 hours of treatment with the anion exchange resin was 340 ppb. When this waste water was further treated with the fixed layer of the treating agent, the mercury concentration was 3 ppb. On the other hand, the mercury concentration after 170 hours was 900 ppb after treatment with the anion exchange resin and 5 ppb after treatment with the treating agent. Further, when waste water containing 8000 – 10,000 ppb of mercury was treated under identical conditions while repeatedly carrying out the desorption and recovery of mercury of the anion exchange resin and its regeneration step, the number of days duration that the treating agent could stand use, i.e. the number of days until the mercury concentration in the waste water subsequent to the treatment with the fixed layer of the treating agent reaches 10 ppb, was 200 days.

EXAMPLES 70 – 73

Experiments were carried out as in Example 68, varying the carrier, the organic compound deposited thereon and the material treated. The results obtained are shown in Table 6.

TABLE 6

| | | Solid treating agent | | | | |
|---|---|---|---|---|---|---|
| | Pretreatment Amount used of anionic exchange resin (g.) | Organic compound used | | | Carrier | |
| Experiment No. | | Name | Amount deposited (wt. percent) | Solvent used | Name | Weight (g.) |
| Example 70 | 63 | Thionalide | 1.6 | Acetone | Silica gel | 120 |
| Example 71 | 1,700 | Pipecoline pipecolyl dithiocarbamate | 5.0 | 3% aq. NaOH sol | Active carbon | 1,000 |
| Example 72 | 4,000 | 2-mercapyobenzothiazole | 5.0 | Same as above | do | 1,600 |
| Example 73 | 63 | p-Dimethylaminobenzylidene rhodanine | 4.0 | Acetone | do | 40 |

| | Contact time with material treated or space velocity | | Material treated | | Metal concentration (p.p.b.) | | |
|---|---|---|---|---|---|---|---|
| Experiment No. | Resin column (l./hr.) | Treating agent column (l./hr.) | Metal to be removed | Property | Before treatment | After passage through resin column or after contact with resin | After passage through treating agent column (120 hrs. later) or after contact with treating agent |
| Example 70 | 3.0 | 1.9 | Hg | Aq. waste water | 7,000 | 240 | 5 |
| Example 71 | Contact time about 3 hours | Contact time about 2.5 hours | Hg | do | 11,600 | 900 | 4 |
| Example 72 | Contact time about 4 hours | Contact time about 2 hours | Hg | Aq. slurry | 5,200 | 500 | 7 |
| Example 73 | 2.0 | 2.0 | Hg | Aq. sol | 10,200 | 350 | 4 |

EXAMPLES 74 – 78 AND CONTROL 5

Fifty grams of thionalide in solution in 150 ml of dichloromethane were flowed down through a glass column of 8 mm inside diameter packed with 15 grams of a carrier material to cause the adsorption to and deposition on the carrier of the thionalide, followed by air drying and waterwashing the carrier. A solution containing 5600 ppb of mercury and 1500 ppb of copper was flowed down through the foregoing packed column, after which the metal concentration was measured with the results shown in Table 7. As can be seen from the results given in this table, better results are had by the use of carbon, silica gel and zeolite, as compared with the other readily available carrier materials such as alumina and magnesia.

TABLE 7

| Experiment No. | Carrier | Organic compound | Metal concentration (p.p.b.) | | | |
|---|---|---|---|---|---|---|
| | | | Before treatment | | After treatment | |
| | | | Hg | Cu | Hg | Cu |
| Example 74 | Active carbon | Thionalide | 5,600 | 1,500 | 50 | 10 |
| Example 75 | Silica gel | do | 5,600 | 1,500 | 65 | 15 |
| Example 76 | Zeolite | do | 5,600 | 1,500 | 60 | 15 |
| Example 77 | Alumina | do | 5,600 | 1,500 | 590 | 550 |
| Example 78 | Magnesia | do | 5,600 | 1,500 | 1,200 | 520 |
| Control 5 | Active carbon | None | 5,600 | 1,500 | 2,100 | 1,000 |

We claim:
1. A treatment process for removing metals which comprises contacting a gaseous phase metal-containing material from which the metal is to be removed, with a solid treating agent consisting of a carrier material and a compound deposited thereon by absorption, said compound being selected from the group consisting of
   a. an organic compound capable of forming a mercaptide compound of a metal selected from:
      1. mercaptide compounds of the formula

R—S—M wherein R is an aromatic group or a group having a terminal —CH= or —CH$_2$— radical, and M is hydrogen or an alkali metal;
      2. thiazole compounds of the formula

wherein R is an aromatic group and M is hydrogen or an alkali metal;
      3. di-alkyldithiocarbamic acids of the formula

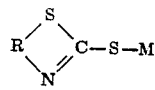

wherein R is a C$_1$ - C$_{10}$ alkyl radical and M is hydrogen or an alkali metal; and
      4. xanthates of the formula

R—O—C—S—M wherein R is butyl or isopropyl and M is hydrogen or an alkali metal;
   b. an organic compound capable of forming a mercaptide compound of a metal selected from:
      1. thiocarbazones of the formula

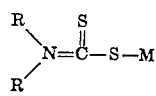

wherein R is an aromatic group;
      2. thioureas of the formula

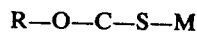

wherein R and R' are each an aromatic group or a C$_1$ - C$_{10}$ alkyl radical;
      3. 2-Mercaptobenzimidazole; and 4. 1-Mercaptoimidazoline; and
   c. an organic compound capable of forming a chelate compound of a metal selected from anthranylic acid, oxine and 2-methyl oxine.

2. The process according to claim 1 wherein said carrier material is selected from the group consisting of carbon, silica gel, silica-alumina gel containing at least 50 percent by weight of silica gel, and zeolite.

3. The process of claim 1 wherein said metal-containing material from which the metal is to be removed by treatment is one containing a metal or metals selected from the group consisting of Hg, Au, Bi, Cd, Co, Cr, Cu, Ni, Pb, Zn, Ag, Mn, Fe, Mo, Ti, Mg and Al.

4. A treatment process for removing metals which comprises contacting a liquid phase metal-containing material from which the metal is to be removed, with a solid treating agent consisting of a carrier material and a compound deposited thereon by adsorption, said compound being selected from the group consisting of
   a. an organic compound capable of forming a mercaptide compound of a metal selected from
      1. mercaptide compounds of the formula R—S—M wherein R is an aromatic group or a group having a terminal —CH= or —CH$_2$— radical, and M is hydrogen or an alkali metal;
      2. thiazole compounds of the formula

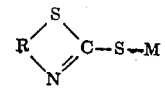

wherein R is an aromatic group and M is hydrogen or an alkali metal;
      3. di-alkyldithiocarbamic acids of the formula

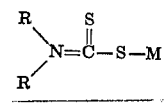

wherein R is a C$_1$ - C$_{10}$ alkyl radical and M is hydrogen or an alkali metal; and
      4. xanthates of the formula R—O—C—S—M wherein R is butyl or isopropyl and M is hydrogen or an alkali metal;
   b. an organic compound capable of forming a mercaptide compound of a metal selected from
      1. thiocarbazones of the formula

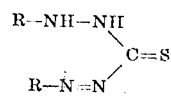

wherein R is an aromatic group;
2. thioureas of the formula

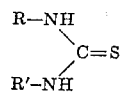

wherein R and R' are each an aromatic group or a $C_1 - C_{10}$ alkyl radical;
3. 2-Mercaptobenzimidazole; and
4. 2-Mercaptoimidazoline; and
c. an organic compound capable of forming a chelate compound of a metal selected from anthranylic acid, oxine and 2-methyl oxine.

5. The process of claim 4 wherein said metal-containing material from which the metal is to be removed by treatment has been pre-treated with an anion exchange resin.

6. The process according to claim 4 wherein said carrier material is selected from the group consisting of carbon, silica gel, silica-alumina gel containing at least 50 percent by weight of silica gel, and zeolite.

7. The process of claim 4 wherein said metal-containing material from which the metal is to be removed by treatment is one containing a metal or metals selected from the group consisting of Hg, Au, Bi, Cd, Co, Cr, Cu, Ni, Pb, Zn, Ag, Mn, Fe, Mo, Ti, Mg and Al.

* * * * *

UNITED STATES PATENT OFFICE
CERTIFICATE OF CORRECTION

Patent No. 3,755,161            Dated August 28, 1973

Inventor(s) Noriyuki YOKOTA, Shingo TOKUDA, Yoshiro ITO and Hiroshi TAKATOMI

It is certified that error appears in the above-identified patent and that said Letters Patent are hereby corrected as shown below:

In the Claims, column 20, line 13: delete "4. 1-Mercaptoimidazoline; and" and insert --4. 2-Mercaptoimidazoline; and--

Signed and sealed this 25th day of December 1973.

(SEAL)
Attest:

EDWARD M. FLETCHER, JR.            RENE D. TEGTMEYER
Attesting Officer                  Acting Commissioner of Patents